Feb. 4, 1941.                A. JONES                 2,230,645
                              DRILL
                        Filed Feb. 1, 1938

INVENTOR
A. JONES
BY
E.R. Nowlan
ATTORNEY

Patented Feb. 4, 1941

2,230,645

UNITED STATES PATENT OFFICE 2,230,645

DRILL

Albert Jones, Jersey City, N. J., assignor to Western Electric Company, Incorporated, New York, N. Y., a corporation of New York Application February 1, 1938, Serial No. 188,029

3 Claims. (Cl. 145—116)

This invention relates to a drill and more particularly to a drill of the spur type.

In using the standard spur type drill to drill holes through various solid materials a button, formed of the last portion of the material cut from the hole in drilling, sometimes clings to the drill, making it necessary for the operator to remove the button by hand, which in some cases tends to be not only hazardous to the operator but results in the loss of time.

An object of the invention is to provide a more efficient and practical spur type drill.

With this and other objects in view the invention comprises a drill having cutting edges disposed at angles between spurs and a smooth tapered brad point so that the vertices of the cutting edges adjacent the brad point align with the extremities of the spurs.

Figure 1:
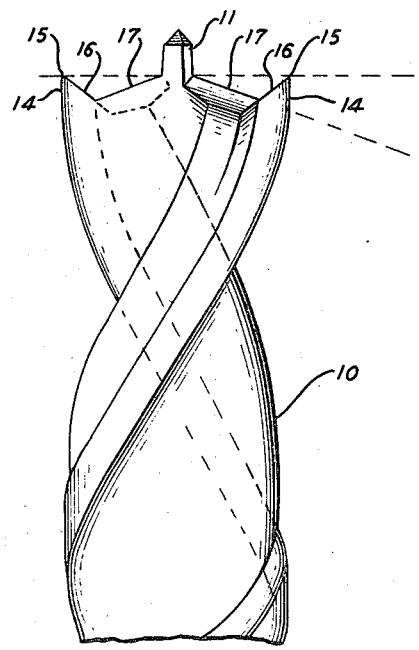
Figure 2:
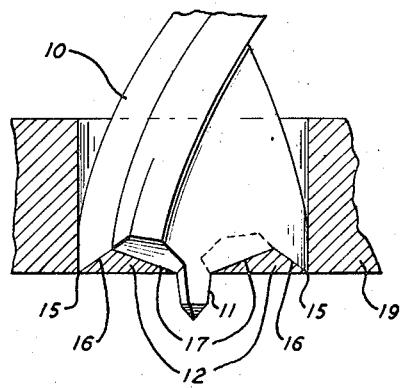

Other objects and advantages will be apparent from the following detailed description taken in conjunction with the accompanying drawing, wherein Fig. 1 is a side elevational view of a drill illustrating the invention; and Fig. 2 is a fragmentary view of the drill illustrating its action while drilling a hole in a piece of material.

Referring now to the drawing, numeral 10 designates a body portion which may be of any desired type, such as the spiral or twist drill type illustrated. At the center of the working end of the body portion is disposed a center or brad point 11, the walls of which are smooth and taper inwardly from its base to a position short of its extremity, from which position the walls are tapered more rapidly to a point. In the present embodiment of the invention the brad point 11 is substantially square in cross sectional contour but if desired this point may be substantially conical in shape or be of other contours, the important features being the smooth walls and the taper thereof so that during the use of the drill the button indicated at 12 in Fig. 2, formed by the drill at the termination of a drilling operation, may freely drop from the drill.

Diametrically opposed spurs 14 formed on the outer portions of the spiral body member have their cutting edges 15 in the circumference of the body portion with inwardly tapered walls 16 extending to points out of alignment with the base of the brad point 11. Cutting edges 17 extend radially from the base of the brad point to the bases of the spurs, the angles formed by the cutting edges 17 and the edges 16 of the spurs being greater than right angles and the angles between the cutting edges and the brad point also being greater than right angles. It will be observed by viewing Fig. 1 that the cutting edges 17 extend at angles so that their vertices, adjacent the base of the brad point, are in a common plane with the edges 15 of the spurs.

For the purpose of illustration let it be assumed that the drill or body portion 10 is rotated to drill a hole through a piece of wood 19 (Fig. 2). At the end of the drilling operation the cutting edges 17 adjacent the brad point will begin cutting their way through the material as the spurs complete their cut, to finish the hole in the wood. The button formed by the drill is cut to substantially a knife edge adjacent its aperture, through which the brad point extends, making it impossible for the button to cling to the smooth tapered walls of the brad point. Furthermore, due to the fact that the angles between the cutting edges and the spurs are greater than right angles, the button formed at the end of the drilling operation cannot cling to the drill but is free to drop therefrom.

It is common practice to place a wooden block or a block of suitable material beneath the material being drilled so as to protect the drill in passing beyond the drilled material at the completion of the drilling operation. When such a block is used the button which has been cut to a fine edge at its inner periphery will be broken at least at its inner edge so that it will freely drop from the end of the drill.

Only one embodiment of the invention has been illustrated and described and it is understood that the invention is not to be limited by the particular arrangements that have been described and shown in detail but only by the scope of the appended claims.

What is claimed is:

1. A drill comprising a body portion having diametrically opposed tapered spurs with outer edges disposed in the periphery of the body portion, tapered cutting edges with the most forward points thereof disposed in alignment with the forward edges of the spurs, and a center point portion having a smooth surface disposed between the cutting edges.

2. A drill comprising a body portion having diametrically opposed tapered spurs with outer edges disposed in the periphery of the body portion, and tapered cutting edges with the most forward points thereof disposed in alignment with the forward edges of the spurs, the angle between the cutting edges and their adjacent spurs being greater than a right angle.

3. A drill comprising a body portion having a smooth surfaced center point extending outwardly from its base axially of the body portion, the body portion also having diametrically opposed spurs with their foremost edges at the periphery of the body portion lying in a common plane with the base of the center point, said spurs having inclined inner surfaces extending from said forward edges to the bases of said spurs and the body portion also having tapered cutting edges with their most forward points disposed in the said plane with the forward edges of the spurs and the base of the center point and extending to the base of the inner surfaces of their respective spurs to form angles therewith greater than right angles.

ALBERT JONES.